April 4, 1939.  J. W. PAGE ET AL  2,153,155

SEAT

Filed Dec. 21, 1938  3 Sheets-Sheet 1

INVENTORS.
JOHN W. PAGE.
WILLARD H. JUMP.
BY Barnes, Kisselle, Laughlin & Raisch
ATTORNEYS.

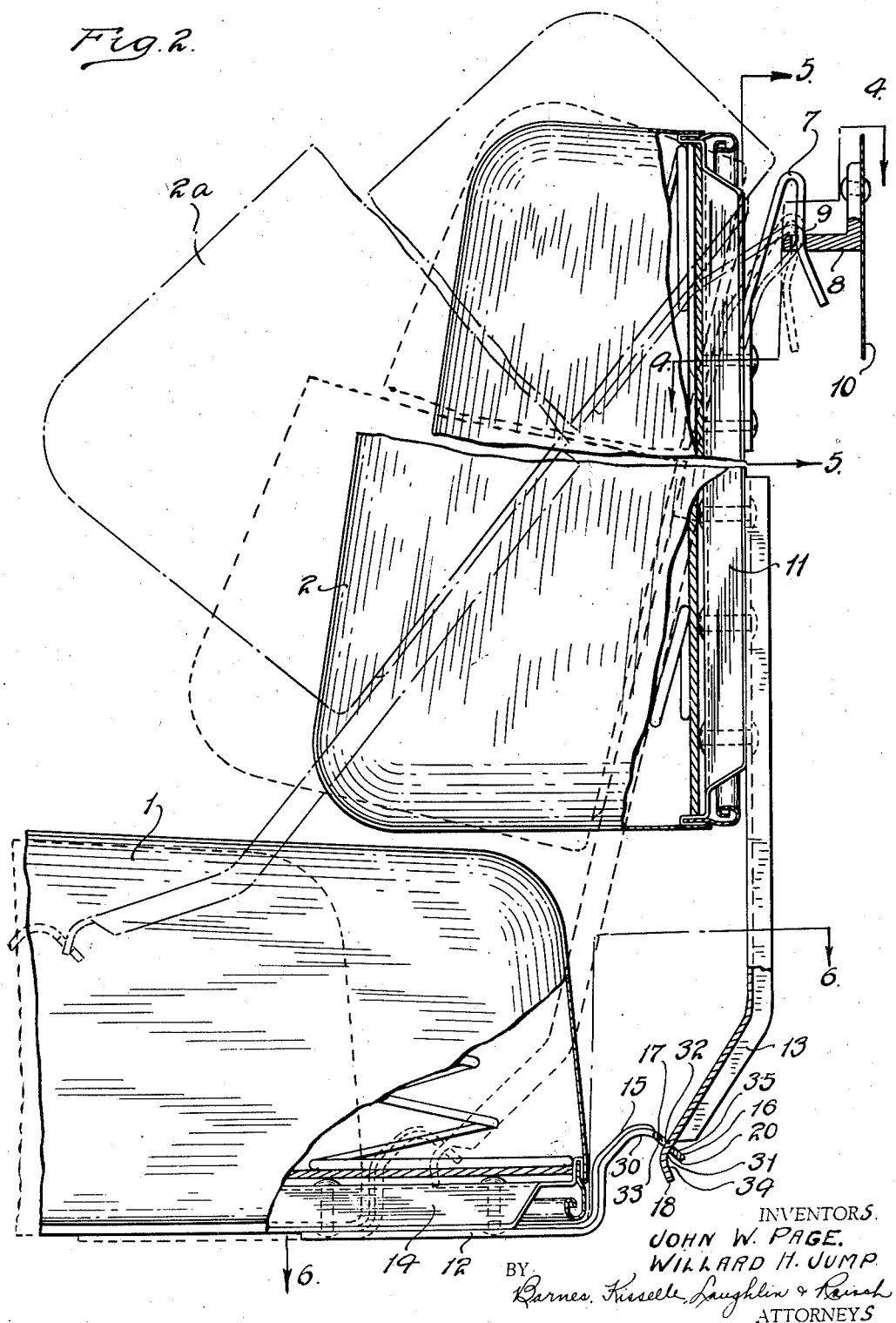

April 4, 1939.  J. W. PAGE ET AL  2,153,155
SEAT
Filed Dec. 21, 1938  3 Sheets-Sheet 3

INVENTORS.
JOHN W. PAGE.
WILLARD H. JUMP.
BY Barnes, Kisselle, Laughlin & Raisch
ATTORNEYS.

Patented Apr. 4, 1939

2,153,155

UNITED STATES PATENT OFFICE 2,153,155

SEAT

John W. Page and Willard H. Jump, Adrian, Mich., assignors to Stubnitz-Greene Spring Corporation, Adrian, Mich., a corporation of Michigan Application December 21, 1938, Serial No. 247,086

3 Claims. (Cl. 155—116)

This invention relates to a seat and more particularly to an adjustable automotive vehicle seat in which the seat bottom is hinged to the seat back. This application is a continuation in part of application Serial No. 195,586, filed March 12, 1938.

It is old in the art to produce an adjustable automobile seat in which the seat bottom is permanently hinged to the seat back. One disadvantage of this type of seat is that it is difficult to assemble in an automotive vehicle and usually requires two men to install the same.

The seat to which this invention relates is particularly adapted for use in the cab of an automobile truck. The back wall of the truck cab to which the support brackets for the seat back are attached is customarily made from thin gauge sheet steel. Because of this the seat support brackets cannot stand any appreciable load, such, for example, as the weight of an ordinary truck driver, without the brackets pulling out or tearing loose from the sheet steel back wall of the cab. It is object of this invention to produce an adjustable seat having a separable hinge connection between the seat bottom and the seat back in which the back wall of the cab is entirely relieved of the load and in which the full weight of the seat back and bottom, as well as the load carried by the seat bottom, is carried by the support for the seat bottom.

It is the object of this invention to produce an adjustable seat having a seat bottom and a seat back hinged together which is easily assembled and disassembled in an automotive vehicle and can be readily assembled and disassembled in an automotive vehicle by one man. This object has been achieved by hinging the seat bottom to the seat back by means of a hinge comprising two butts which are inseparably connected within the normal range of adjustment of the seat but which can be readily separated to permit separation of the seat back from the seat bottom when the seat is adjusted beyond its normal range of adjustment.

In the drawings:

Fig. 1 is a side elevation of the seat with two dotted line showings of the seat indicating the normal range of adjustment of the seat and the position of the seat back when moved beyond its normal range of adjustment to connect the seat bottom to the seat back.

Fig. 2 is an enlarged fragmentary side elevation of a seat partly in section showing the relative positions of the hinge butts which connect the seat back to the seat bottom and the hinge butts which connect the seat back to the wall of the cab during the normal range of adjustment of the seat and at the point at which the seat bottom and back have been pulled forwardly beyond the normal range to automatically disconnect the seat bottom from the back. Fig. 2 also shows the hinges in section along the line 2—2 of Fig. 3.

Figure 1:
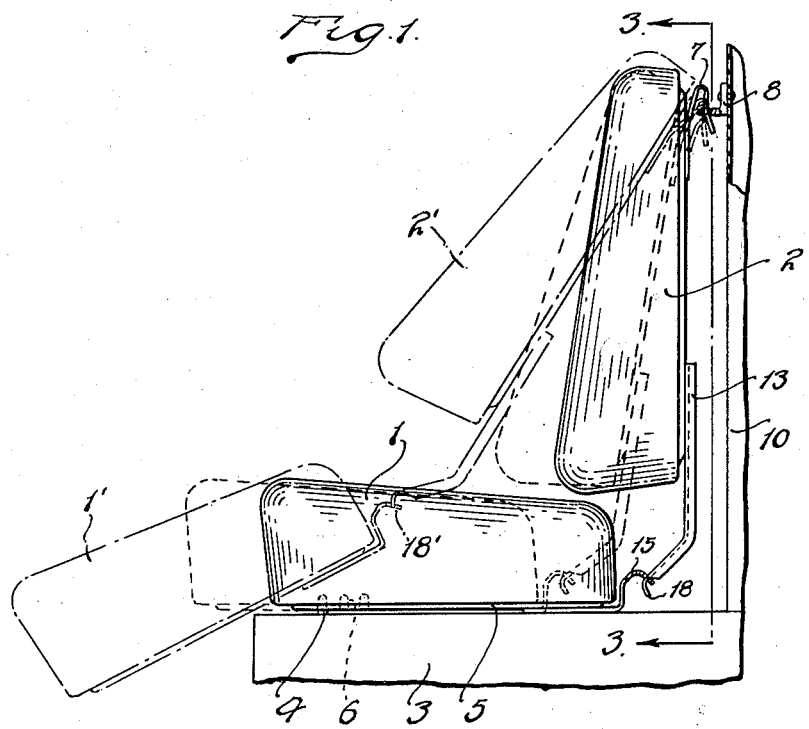
Figures 4, 6:
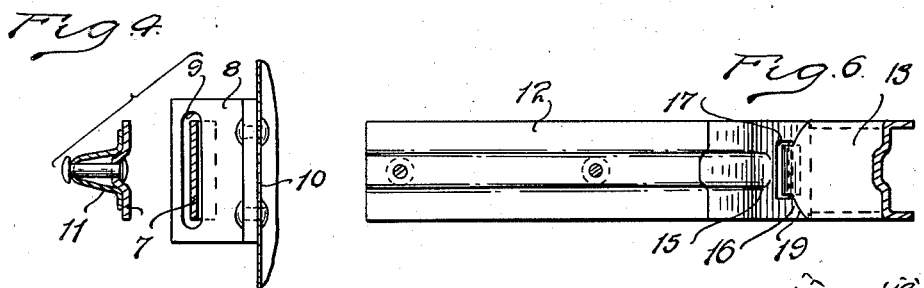
Fig. 4 is a section along the line 4—4 of Fig. 2.
Fig. 6 is a section along the line 6—6 of Fig. 2.
Figure 5:
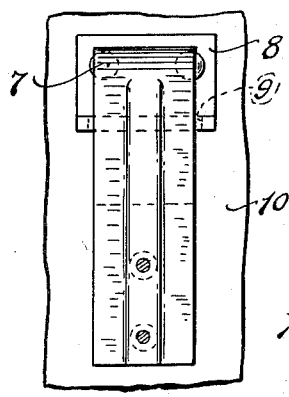
Fig. 5 is a section along the line 5—5 of Fig. 2.

Referring more particularly to the drawings there is shown a seat comprising a seat bottom 1 and a seat back 2. The seat bottom and back as herein shown take the form of upholstered spring cushions. The seat bottom is carried by a support 3 having dowel pins 4 at each side of the support. The frame 5 of the seat bottom is provided with a plurality of openings 6 along each side which receive the dowel pins 4 to hold the seat in its several positions of adjustment. Thus, the seat can be adjusted fore and aft along the seat bottom support 3 within the range provided by the openings 6, which may be called the normal range of seat bottom adjustment, and the seat bottom held in any one of these positions by the interengagement of the dowel pins 4 in the openings 6.

The seat back 2 has welded or otherwise secured thereto the hooked brackets 7 which interengage the angle iron support bracket 8 in the openings 9. The angle iron support bracket 8 is fixed to the seat back support 10 of thin gauge sheet steel. Each bracket 7 is preferably welded to one of the cross slats 11 of the seat back frame. The hooked brackets 7 cooperate with the angle iron supports 8 to form a separable support hinge for the seat back 2.

The seat bottom 1 is hinged to the seat back 2 by means of the hinge brackets 12 and 13. The hinge brackets 12 and 13 are fixed respectively to the seat bottom and the seat back. As shown, the hinge bracket 12 takes the form preferably, but not necessarily, of a separate piece of metal welded to one of the cross slats 14 of the seat bottom frame and the hinge bracket 13 takes the form preferably, but not necessarily, of a separate piece of metal welded to one of the cross slats 11 of the seat back. As shown, the seat bottom is hinged to the seat back 2 by two separate pairs of hinge brackets 12, 13. Since these pairs of hinge brackets are identical, only one will be described. The hinge bracket 12 has a portion which is bent upwardly and then outwardly as at 15 at an angle of about 45° from the horizontal. The bracket 12 is bent about a radius 30 and terminates in an end portion 16 which makes an angle of approximately 90° with the portion 15. These angles, of course, can be varied within fairly wide limits to obtain the same results described below. The portion 15 is provided preferably with a rectangular opening 17 which receives the hooked tongue 18 of the hinge bracket member 13. The bracket 13 is provided with the shoulders 19 and is bent about a radius 31 where it terminates in the hooked tongue 18.

Figure 7:
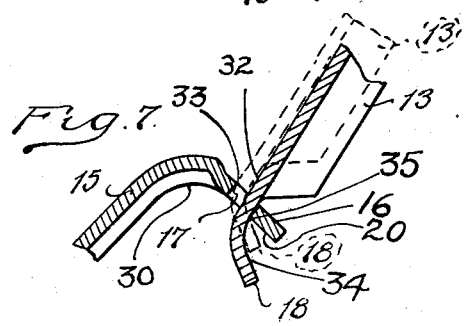
Fig. 7 is an enlarged fragmentary detail view showing the relative position of the hinge butts which connect the seat bottom and seat back.
Figure 3:
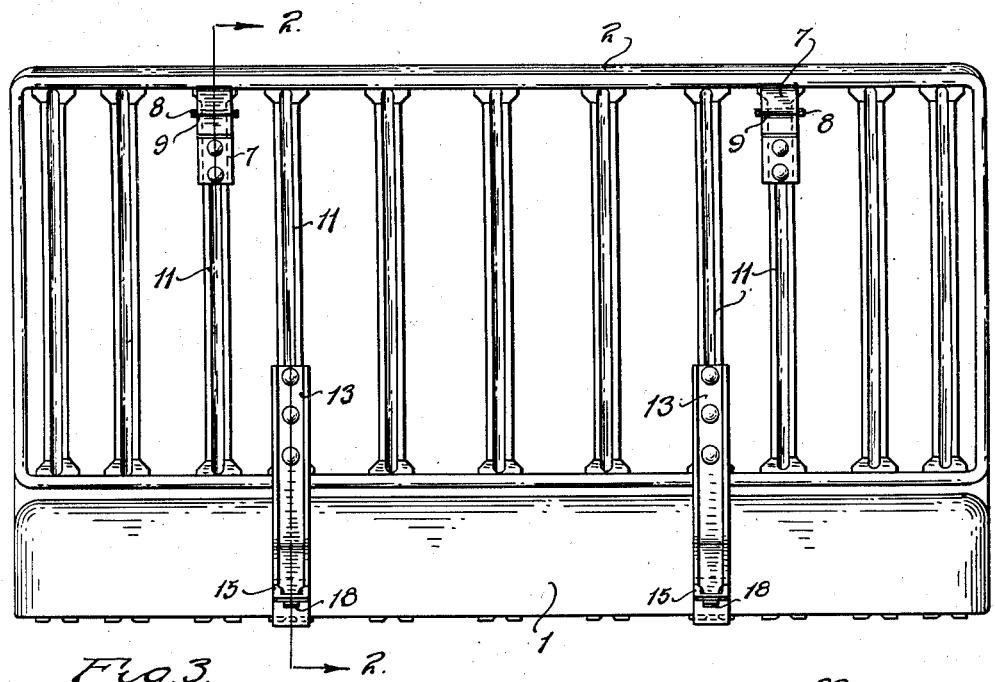
Fig. 3 is a rear elevation along the line 3—3 of Fig. 1.

To assemble the seat in the automotive vehicle the seat back 2 is first mounted upon the seat back support 10 by passing the hooks 7 through the openings 9 in the angle iron support 8. The seat bottom preferably is then placed in the position indicated by the dotted line showing 1' and the seat back swung out to the position indicated by the dotted line showing 2' in Fig. 1. In this position the hooked tongue 18 can be passed vertically downwardly through the opening 17 in the bracket 12 to connect the brackets 12 and 13. However, as soon as the seat bottom 1 is moved rearwardly or to the right from the dotted line position 1', shown in Fig. 1, the hooked end 18 becomes interlocked in the opening 17 with the portion 16 of the bracket 12. A study of the drawings indicates why the hooked tongue 18 becomes interlocked in the opening 17, see Fig. 7. When the seat bottom 1 is moved rearwardly from the position indicated by the dotted lines 1', the hooked end 18 moves from the vertical position 18' (Fig. 1) to a relatively inclined position where it hooks under the bottom face 29 of the portion 16 of the bracket 12, as shown in Fig. 7.

After the hinge brackets 12 and 13 have been interengaged the seat bottom 1 and the back 2 are moved rearwardly and the seat latched in any one of its adjustable positions by engagement of the dowels 4 in the openings 6. As shown there are three openings 6 along each side of the seat bottom 1, the dowel pin 4 in the full line showing of Fig. 1 engaging in the foremost opening 6.

The angle of the hooked tongue 18 and the portion 16 of the bracket 15 having the opening 17 are so arranged that within the normal range of adjustment of the seat bottom the hooked end cannot be disengaged from the opening 17, i. e., brackets 12 and 13 are hooked together. When seat bottom 1 is latched against movement by dowel pins 4, seat back 2 cannot swing about hinge supports 7 and 8 except for the minute tolerance or clearance between hooked end 18 of bracket 13 and the opening 17 in bracket 12. Under these conditions any possible upward or vertical movement of seat back 2 with respect to bottom 1 except that permitted by said slight clearance or tolerance, is also prevented because front face 32 of bracket 13 binds against the upper edge 33 of opening 17 and the concave face 34 of hooked end 18 contacts and is hooked under bottom edge 35 of opening 17, see Fig. 7. The seat back is thus locked to the seat bottom. The normal range of adjustment of the seat can be varied but as shown herein this range is determined by the distance between the end or first and last openings 6 of the three openings with which the seat bottom is provided along each side for engagement with the dowel pins 4.

To disassemble seat bottom 1 from seat back 2, it is only necessary to slide or pull seat bottom forwardly beyond the normal range of adjustment whereupon brackets 12 and 13 automatically disengage as end 18 of bracket 13 rides out of opening 17 in bracket 12, see dotted line position 2a, Fig. 2.

In the form of seat shown in Figs. 1 through 7, the seat bottom 1 is adjustable along the plane of the surface of the support 3. Therefore, as the seat bottom 1 is adjusted rearwardly from its forwardmost position the seat back 2 swings about the angle iron support 8 but support 8 carries no load, see Fig. 2. During the fore and aft adjustment of the seat bottom 1 within its normal range of adjustment the hooked bracket 7 freely moves up and down in the opening 9 in the angle iron support 8. The seat bottom support 3 through brackets 12 and 13 carries the full weight of back 2 at all times within normal range of adjustment of the seat (note clearance between bracket 8 and top of bracket 7, Fig. 2, within normal range of seat adjustment). The weight of back 2 is transferred to support 3 through shoulders 19 of bracket 13 which rest upon portion 16 of bracket 12 during normal adjustment range of the seat.

It should be noted that when the seat bottom 1 is loaded, none of the load is transferred to the seat back support 10 but the load on the seat as well as the weight of the seat bottom and back is borne entirely by support 3. Thus there is no occasion for reinforcing light sheet steel support 10, which is the back wall of the truck cab, to prevent support brackets 8 from tearing loose. Note also that rearward adjustment of the seat bottom acts through brackets 12 and 13 to raise the seat back and forward adjustment of the seat bottom lowers the seat back owing to the floating connection between brackets 7 and 8.

Figure 8:
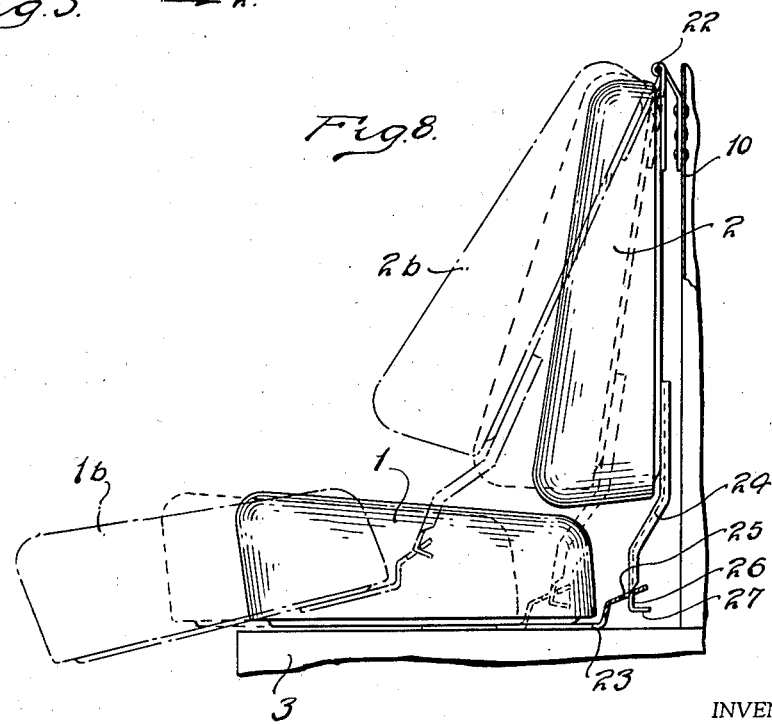
Fig. 8 is a side elevational view similar to Fig. 1 showing a modified form of separable hinge between the seat bottom and seat back.

In Fig. 8 there is shown a modified form of seat. In this arrangement the seat back 2 is supported adjacent the top edge to support 10 by hinge 22 comprising a pair of hinge butts connected by a pin. Thus hinge 22 provides a fixed axis about which the back 2 swings and back 2 is not free to move vertically with respect to wall 10. Since in this modified form of seat construction it is also proposed to free back 2 and support 10 from carrying any of the load imposed upon the seat bottom 1, therefore seat bottom 1 is connected to seat bottom 2 by two pairs of brackets 23 and 24. The seat back 2 and seat bottom 1, as well as the support for the seat bottom 1, are identical with the parts of the principal form of the invention described above. Seat bracket 23 is secured to seat bottom 1 and bracket 24 to the seat back 2. Bracket 23 is provided with an opening 25 through which bracket 24 passes. Bracket 24 comprises a vertical portion 26 and a horizontal portion 27. Portions 26 and 27 cooperate to form a hooked end on bracket 24. Within the normal range of fore and aft adjustment of the seat bottom 1, portion 26 of bracket 24 slides up and down in the opening 25 so that no load is transferred from the seat bottom 1 through bracket 24 to the seat back 2 and support 10. Hooked end 27 within the normal range of adjustment prevents disconnection of bottom 1 from back 2. To disconnect bottom 1 from back 2, bottom 1 is pulled forwardly to the dotted line position 1b, Fig. 8, whereupon the seat back 2 can be swung slightly forward of the dotted line position 2b which swings the end 27 out of opening 25 to disconnect brackets 23 and 24. In the modified form of the seat, unlike the principal form of the seat, the bottom 1 cannot be automatically disconnected from the back 2 by pulling the same forwardly beyond the normal range of adjustment.

A further advantage of both forms of this seat is the fact that the separable, pinless hinge 12, 13 lends itself to ready and facile assembly whereby but one man is needed to assemble the seat in the truck cab.

We claim:—

1. A vehicle seat including a seat back, a seat bottom, a support for holding the seat back in upright position, a support for the seat bottom along which the seat bottom is adjustable forwardly and rearwardly throughout a predetermined normal range, said seat bottom support being the sole support for supporting the seat bottom and any load imposed thereon throughout its entire range of adjustment, a swingable and shiftable connection between the upper end of the seat back and said seat back support comprising an inverted V bracket supported entirely by the seat back and a slotted bracket supported entirely by the seat back support, the apex of the inverted V bracket remaining clear and above the slotted bracket within the normal range of adjustment of the seat bottom and back whereby the seat back is free to swing about said connection and shift upwardly and downwardly along said seat back support as said seat bottom is adjusted forwardly or rearwardly without transferring any load from the seat bottom to said seat back support, and a hinge connecting said seat back to said seat bottom, said hinge including a bracket secured to the lower end of said seat back and a bracket secured to said seat bottom, one of said brackets having a hooked end and a shoulder adjacent said hooked end and the other a socket for receiving the said hook, the said hook interengaging the said socket with the shoulder bearing against the socketed bracket throughout the normal range of adjustment of the said seat bottom and back whereby the seat back is supported by the seat bottom bracket, the hooked end of the one bracket being freely and automatically disconnectable from the said socket by moving the seat bottom and back forwardly beyond the normal range of adjustment.

2. A vehicle seat including a seat back, a seat bottom, a support for holding the seat back in upright position, a support for the seat bottom along which the seat bottom is adjustable forwardly and rearwardly throughout a predetermined normal range, said seat bottom support being the sole support for supporting the seat bottom and any load imposed thereon throughout its entire range of adjustment, a swingable and shiftable connection between the upper end of the seat back and said seat back support comprising a member supported entirely by the seat back support and a member supported entirely by the seat back within the normal range of adjustment whereby the seat back is free to swing about said connection and shift upwardly and downwardly along said seat back support as said seat bottom is adjusted forwardly or rearwardly without transferring any load from the seat bottom to said seat back support, and a hinge connecting said seat back to said seat bottom, said hinge including a bracket secured to the seat bottom having an end portion extending at an angle of about 45° from the horizontal plane of the seat support and having a slot, said hinge also including a bracket secured to the seat back having an angularly extending portion projecting through the opening in the end portion of the first-mentioned bracket and underlying the end portion beyond the opening during the normal range of seat adjustment whereby said brackets are locked together within the normal range of adjustment of said seat and automatically unlocked by adjusting the seat forwardly beyond its normal range of adjustment.

3. A vehicle seat assembly comprising in combination a seat back, a seat back support, connections between the seat back and seat back support, each connection consisting of a bracket secured to the seat back having a downwardly turned end spaced from the seat back and a slotted member carried by the seat back support whereby the seat back can be assembled to its support by slipping the downwardly turned ends of the bracket through said slotted members, a seat bottom adjustable forwardly and rearwardly within a given range, separable hinge connections between the seat back and seat bottom, each connection comprising a bracket secured to the seat back and a bracket secured to the seat bottom, one of said brackets having a slot and the other a curved end adapted to be slipped into and out of said slot when the seat back is swung outwardly beyond the normal range of adjustment and interlocking said seat back and seat bottom within their normal range of adjustment, and a shoulder on said seat back bracket resting on the seat bottom bracket within the normal range of adjustment whereby the seat bottom supports the seat back free of any load.

JOHN W. PAGE.
WILLARD H. JUMP.